United States Patent
Okada et al.

[11] Patent Number: 5,880,900
[45] Date of Patent: Mar. 9, 1999

[54] ERROR RECOVERY METHOD AND DISK DRIVE APPARATUS TO SUPERIMPOSE A VIBRATION SIGNAL WITH ONE-HALF FREQUENCY ONTO A DRIVING SIGNAL TO A MAGNETORESISTIVE HEAD

[75] Inventors: Kenji Okada, Yokohana; Koichi Arai, Fujisawa; Hisashi Kakuta, Yamato; Hiroaki Suzuki, Fujisawa; Masakazu Sasaki, Yamato; Akira Kibashi, Zama; Tatsuya Endo, Fujisawa, all of Japan

[73] Assignee: International Business Machines Corporation, Armonk, N.Y.

[21] Appl. No.: 752,920

[22] Filed: Nov. 20, 1996

[30] Foreign Application Priority Data

Dec. 19, 1995 [JP] Japan .................................. 7-330300

[51] Int. Cl.$^6$ .................................................. G11B 27/36
[52] U.S. Cl. ................................................. 360/75; 360/25
[58] Field of Search .............................. 360/69, 75, 104, 360/128, 129

[56] References Cited

U.S. PATENT DOCUMENTS

| | | | |
|---|---|---|---|
| 4,922,356 | 5/1990 | Yamaguchi et al. | 360/104 |
| 5,321,568 | 6/1994 | Hatam-Tabrizi | 360/104 |
| 5,461,521 | 10/1995 | Ito et al. | 360/75 |
| 5,527,110 | 6/1996 | Abraham et al. | 360/75 X |
| 5,636,089 | 6/1997 | Jurgenson et al. | 360/104 |
| 5,640,089 | 6/1997 | Horikawa et al. | 360/75 X |
| 5,640,755 | 6/1997 | Kubota et al. | 360/103 X |
| 5,666,241 | 9/1997 | Summers | 360/104 |

FOREIGN PATENT DOCUMENTS

| | | | |
|---|---|---|---|
| 61-156525 | 7/1986 | Japan | 360/75 |
| 61-266524 | 5/1988 | Japan | 360/75 |
| 6-020267 | 1/1994 | Japan | 360/75 |

OTHER PUBLICATIONS

Kobayashi, Stuck Object Removing Method For Head, Patent Abstracts of Japan, vol. 15, No. 435, Nov. 1991.

Yamada, Manufacture of Magnetic Disk Medium, Patent Abstracts of Japan, vol. 11, No. 370, Dec. 1987.

*Primary Examiner*—Aristotelis M. Psitos
*Assistant Examiner*—Kin Wong
*Attorney, Agent, or Firm*—Karuna Ojanen

[57] ABSTRACT

A disk drive apparatus and a method for executing an error recovery process for an error caused by thermal asperity is set forth by positioning a disk read/write head in the vicinity of a thermal asperity and then by vibrating the head so that the head hits the foreign matter or protrusion on the surface of the disk causing the thermal asperity. Vibrations in the longitudinal direction are generated in a head by supplying a vibration signal to VCM. The vibration signal is superimposed on a head driving signal. During the vibration process, the head is positioned on a track shifted from a thermal asperity causing track by several tracks in order to hit the thermal asperity by an edge of a head.

2 Claims, 10 Drawing Sheets

ERROR RECOVERY METHOD AND DISK DRIVE APPARATUS TO SUPERIMPOSE A VIBRATION SIGNAL WITH ONE-HALF FREQUENCY ONTO A DRIVING SIGNAL TO A MAGNETORESISTIVE HEAD

FIELD OF THE INVENTION

The present invention relates to a disk drive apparatus, particularly to a disk drive apparatus and a method capable of removing a protrusion from a disk and recovering an error caused by the protrusion on a disk.

BACKGROUND OF THE INVENTION

In a magnetic disk drive apparatus, a magnetoresistive (MR) head is positioned on a target track of a hard disk and data is magnetically read from or written onto the disk by a magnetic head. The data is embedded in the magnetic domains on the disk. The output resistance of a MR head changes as a magnetic field of the domains change. By applying a predetermined current to an MR element, the resistance change is converted to a DC voltage signal to execute data read.

The MR head is kept a slight space above the disk during the read or write operation. A thermal asperity is a protrusion on a disk which interrupts data read or write. When the thermal asperity contacts the MR head component, the strip temperature of the MR head may locally rise to 100° C. or higher. The term thermal asperity thus refers to the protrusion itself and/or the phenomena of the rise in temperature. The temperature increase is caused by a mechanical collision between a head portion including an MR stripe and the protrusion on the surface of a disk. The resistance change rate of an MR head resulting from a change of a magnetic field at the time of normal read is less than one percent of an original resistance of the MR stripe. A signal change resulting from a temperature rise because of a thermal asperity greatly exceeds a resistance change due to normal read and as a consequence, normal data read is interrupted.

There are some conventional methods for protecting read data from a thermal asperity. For example, when the signal changes suddenly, probably because of a thermal asperity, the read signal is properly changed by some signal compensation method such as an error correction code (ECC). Such conventional methods, however, have some disadvantages. The thermal asperity often causes a large burst error, and the number of bits which are correctable by ECC is limited, so most errors caused by a thermal asperity cannot be corrected by ECC. Thus, errors caused by a thermal asperity have been regarded as nonrecoverable hard errors. Conventional measures, therefore, cannot be a method for completely solving the problem caused by a thermal asperity.

It is an object of the present invention to provide a disk drive apparatus and a method capable of recovering an error resulting from a thermal asperity. This invention removes a thermal asperity, then resolves the disadvantages of the above conventional thermal-asperity prevention measures.

SUMMARY OF THE INVENTION

To achieve the above objects, the disk drive apparatus of the present invention removes a protrusion (thermal asperity) on a disk surface and then recovers the error resulting from the thermal asperity. The removal is performed by vibrating a head and making the air bearing surface of a head assembly hit the thermal asperity. By hitting a thermal asperity with the head, the thermal asperity is scrubbed and removed. This removal step is performed as one of the data recovery operations when a sudden signal change probably resulting from a thermal asperity through read operation of a signal reading by MR head is detected.

According to the present invention, a protrusion is scrubbed and smashed by a head which is vibrated by a vibration signal. This vibration signal has a predetermined frequency and is superimposed on a head driving signal while the head is positioned on the track or in the vicinity of the track where the error occurred. The superimposed signal induces vibration of the head so that the head vibrates horizontally and vertically so that the air bearing surface of the head hits the protrusion on the disk.

Thus, the invention comprises a disk drive apparatus having a disk and a head, and further comprising a head driving assembly for driving the head in a radial direction of said disk in response to a driving signal, and a vibration signal generator for generating a vibration signal, a means for superimposing the vibration signal onto the driving signal, both the vibration signal and the driving signal supplied to the head driving means, so that vibrations are induced in the head while it is located in the vicinity of a track having a read or write error, the vibrations having a horizontal and vertical component. The head which reads and writes data to the disk may be a magnetoresistive head. The vibrations of the head which are induced by the vibration signal have an amplitude sufficient for the head to hit a protrusion or foreign matter on a disk causing said read or write error. In addition, the vibrations of the head have an amplitude sufficient for an edge of the head to hit a protrusion or foreign matter on a disk causing said read or write error. The magnetoresistive head is attached to a dimple integrated with a flexure and as the magnetoresistive head vibrates it rolls about or rocks on the dimple and the air bearing surface of the magnetoresistive head hits and smashes the protrusion or foreign matter on the disk thereby removing the protrusion or foreign matter and recovering the error. The invention further comprises a means to position the head in the vicinity of said track having the read or write error, the position determined by the track density and the geometry of the head. The vibration signal can either be generated in hardware or software, wherein, in one instance a controller generates the vibration signal with microcodes and combines the signal with the driving signal. In another instance, the vibration signal is generated by a wave generator and an adder superimposes the vibration signal onto the signal driving the voice coil motor.

The invention is also an error recovery method for recovering an error occurred in a disk drive apparatus, the method comprising the steps of positioning a head in the vicinity of a track causing an error, generating a vibration signal, superimposing the vibration signal onto a driving signal to form a combined signal supplied to a head driving means, vibrating said head in at least a vertical direction in accordance with said combined signal so that the vibrating head hits and removes a protrusion or foreign matter on the disk. The frequency of the vibration signal may be one-half the sampling frequency of the servo signal. The method also comprises positioning the head so that as the head vibrates, the edge of the head hits the protrusion or foreign matter on said disk. And the step of positioning still further comprises positioning the head in the vicinity of the track causing the error based on a size and geometry of the head and upon a track density of the disk. The step of generating a vibration signal may be accomplished in a controller by microcode and the controller superimposes said vibration signal on said driving signal, or the vibration signal may be generated in a wave generator in response to a third signal from the controller and an adder then superimposes the vibration signal onto the diving signal. The inventive method herein may be combined with other error recovery operations, such as changing the bias current of the head, adjusting the gain of an output signal from the head, and implementing an error correction code.

The invention will farther be understood by the following description of the invention when read in conjunction with the drawings.

BRIEF DESCRIPTION OF THE DRAWINGS

FIGS. 4(*a*) and 4(*b*) shows a read signal waveform in the disk drive apparatus of the present invention; FIG. 4(*a*) illustrates a read signal waveform of a thermal asperity and FIG. 4(*b*) is a read signal waveform in the absence of a thermal asperity.

FIGS. 6(*a*) to 6(*c*) shows the movement of a slider when adding the vibration signal of the present invention.

FIGS. 9(*a*) to 9(*c*) show a thermal-asperity smashing process by a head in accordance with the method of the present invention.

DETAILED DESCRIPTION OF THE DRAWINGS

Figure 1:
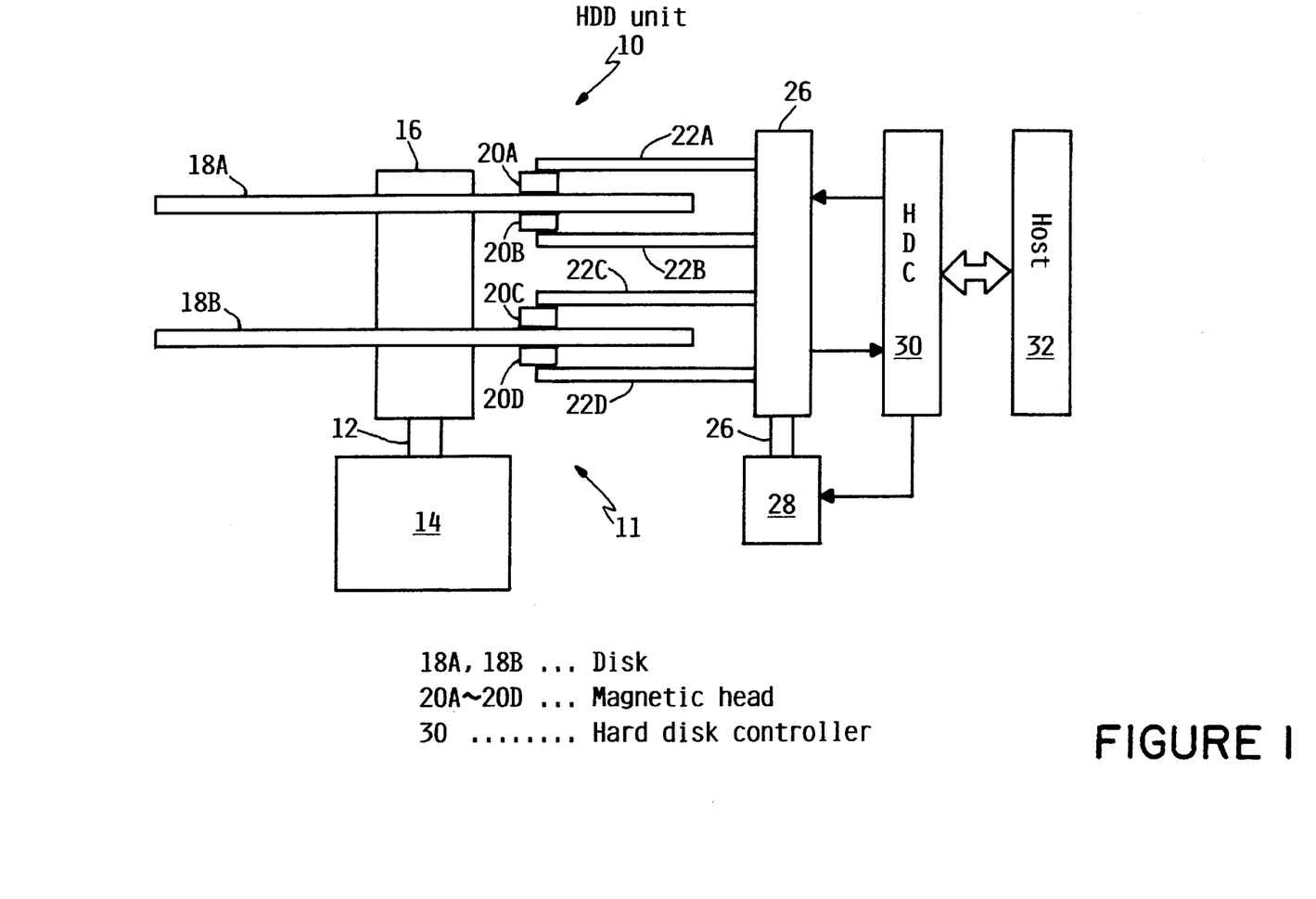
FIG. 1 shows a disk drive apparatus of the present invention.

FIG. 1 shows a hard disk drive apparatus (HDD) embodying the present invention. As shown in FIG. 1, a disk drive apparatus 10 comprises a disk section 11 and a hard disk controller (HDC) 30 provided with a local processor. The disk section 11 is provided with a disk drive 14 for rotating a shaft 12 at a high speed. A cylindrical support 16 is set to the shaft 12 so that their axes coincide with each other and information recording disks 18A and 18B are set to the outer periphery of the support 16 at predetermined intervals. When the shaft 12 is rotated by the disk drive 14, the disks 18A and 18B are rotated integrally with the support 16.

Heads 20A to 20D are supported by access arms 22A to 22D so as to face the corresponding disk surface. The access arms 22A to 22D are set to a head drive 28 through a shaft 26. The heads 20A to 20D can be positioned at desired portions of the disks. The disk drive 14 and the head drive 28 are connected to the HDC 30 so that their number of revolutions and speed are controlled. The HDC 30 can be connected to a host 32.

Figure 2:
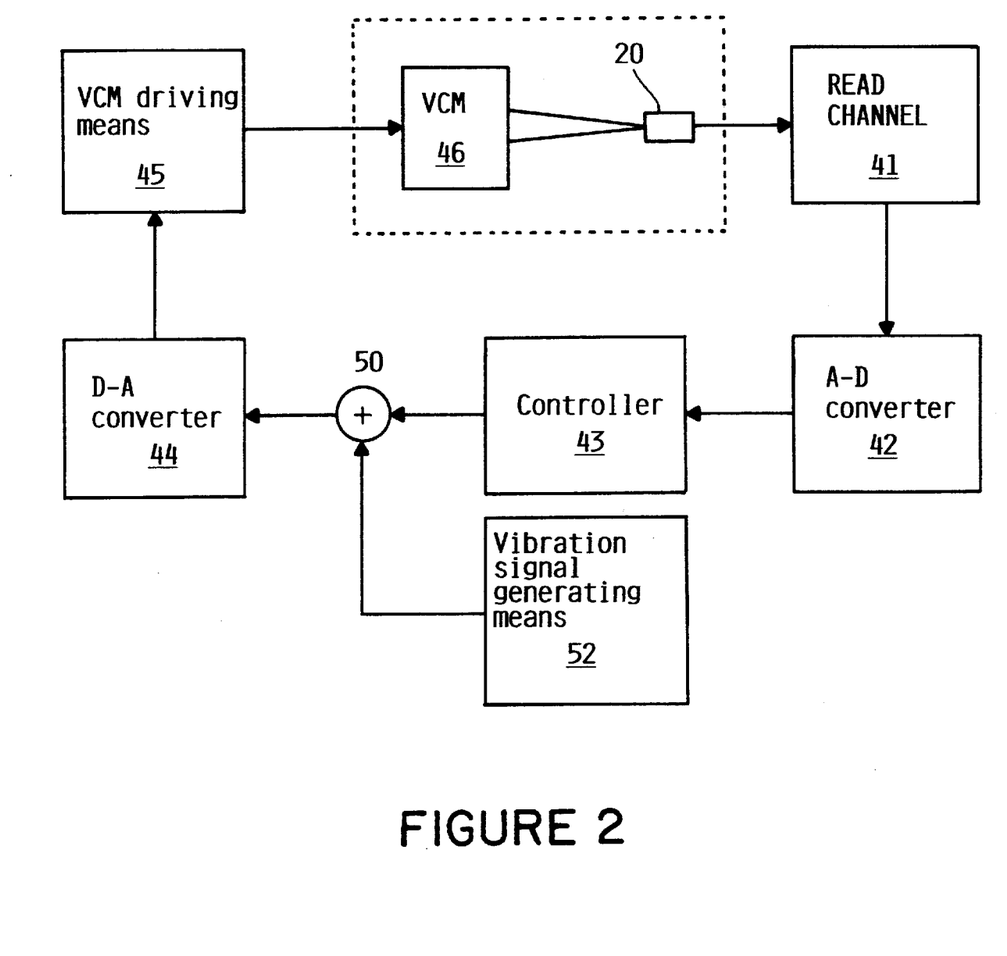
FIG. 2 is a block diagram of the disk drive apparatus of the present invention.

FIG. 2 is a block diagram showing a structure for driving a head used in the present invention. A head 20 reads a servo signal recorded on a disk and supplies the read signal to a controller 43 through a read channel 41 and an A-D converter 42. The controller 43 detects a deviation between the servo signal read by the head 20 and a target head position for a track and then transmits a signal to a D-A converter 44 which supplies a signal to the voice coil motor (VCM) driving means 45 to correct the deviation. A VCM 46, driven by the signal supplied to the VCM driving means 45, moves the head 20 to a target position. While the head is being positioned on a target track for reading data, a control signal is continuously transmitted to the VCM driving means 45 so the head does not deviate from the target track.

Figure 3:
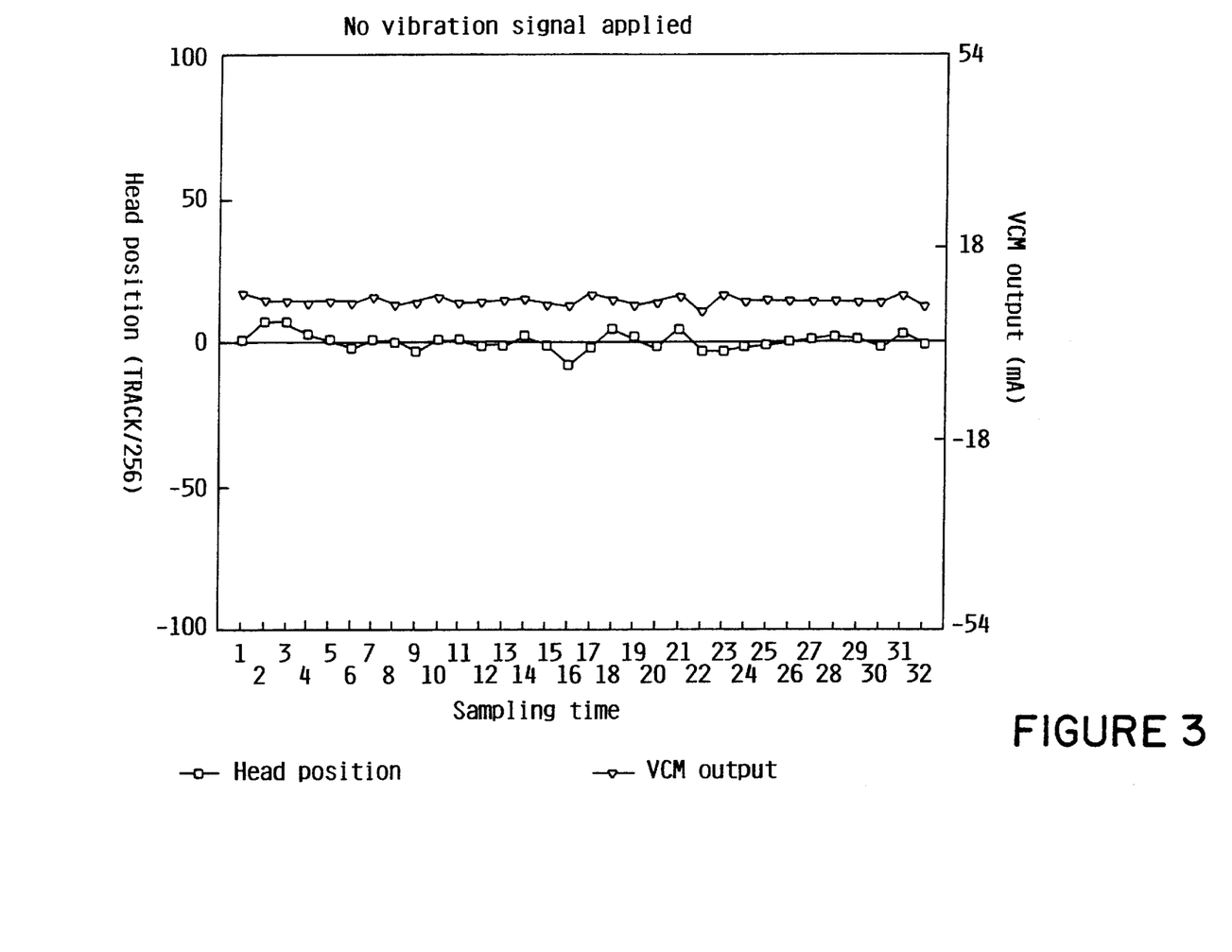
FIG. 3 is a signal waveform diagram of a head driving signal in the disk drive apparatus of the present invention.

FIG. 3 shows the signal waveforms input to the VCM driving means 45 while a head is positioned on a desired track. The X axis shows the sampling time; the left Y axis shows the position of a head derived from the servo signal read by the head as a fraction of a track wherein a value of 256 is a deviation of one track. A deviation of 0 from a target track shows the value 0. The right Y axis shows the input to the VCM driving means. Corresponding to a deviation of the head position, a VCM is driven to correct the deviation. From FIG. 3, the head position and the VCM driving signal output are kept almost constant as the head stably follows the desired track.

In FIG. 2, an adder 50 is positioned between the controller 43 and the D-A converter 44. The adder 50 adds signals output from vibration signal generating means 52 to the signal from the controller 43 and inputs the combined signal to the D-A converter 44. While the head is controlled under the normal servo signal, that is, the normal read or write state, the vibration signal generating means 52 does not operate. Only a signal output from the controller 43 is input to the VCM driving means 45 through the D-A converter 44. When an error, probably resulting from a thermal asperity on a disk, occurs, however, the vibration signal generating means 52 is operated in accordance with an instruction from an HDC 30 for executing error recovery in FIG. 10 to be mentioned later. A vibration signal from the vibration signal generating means 52 is superimposed at adder 50 on a signal from the controller 43 and input to the VCM driving means 45 through the D-A converter 44. Alternatively, as discussed later, the vibration signal can be generated by the HDC 30 itself using microcode.

Figure 4A:
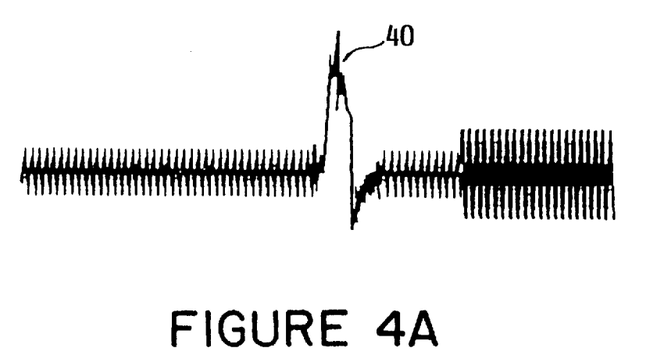
Figure 4B:
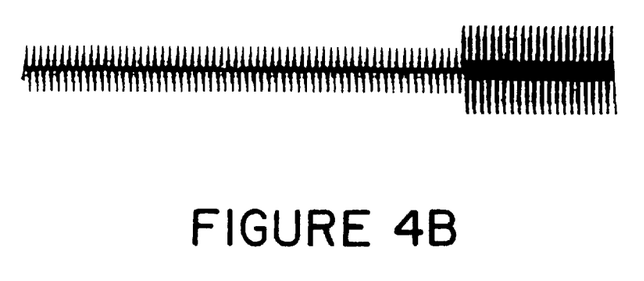

When the head 20 contacts a protrusion (thermal asperity) on the disk, the head temperature rises because of the contact between the MR element and the protrusion, as previously described. As a result, the resistance of an MR element serving as a read signal transducer element changes and a read signal shows a sharp change, as shown in FIG. 4(*a*), which causes an error. A read signal when a thermal asperity occurs has a very characteristic waveform compared to general data signal shown in FIG. 4(*b*). When a sharp read signal, probably resulting from a thermal asperity, is detected, a signal from the vibration signal generating means 52 is superimposed on a signal from the controller 43 and input to the VCM driving means 45 for error recovery.

Figure 5:
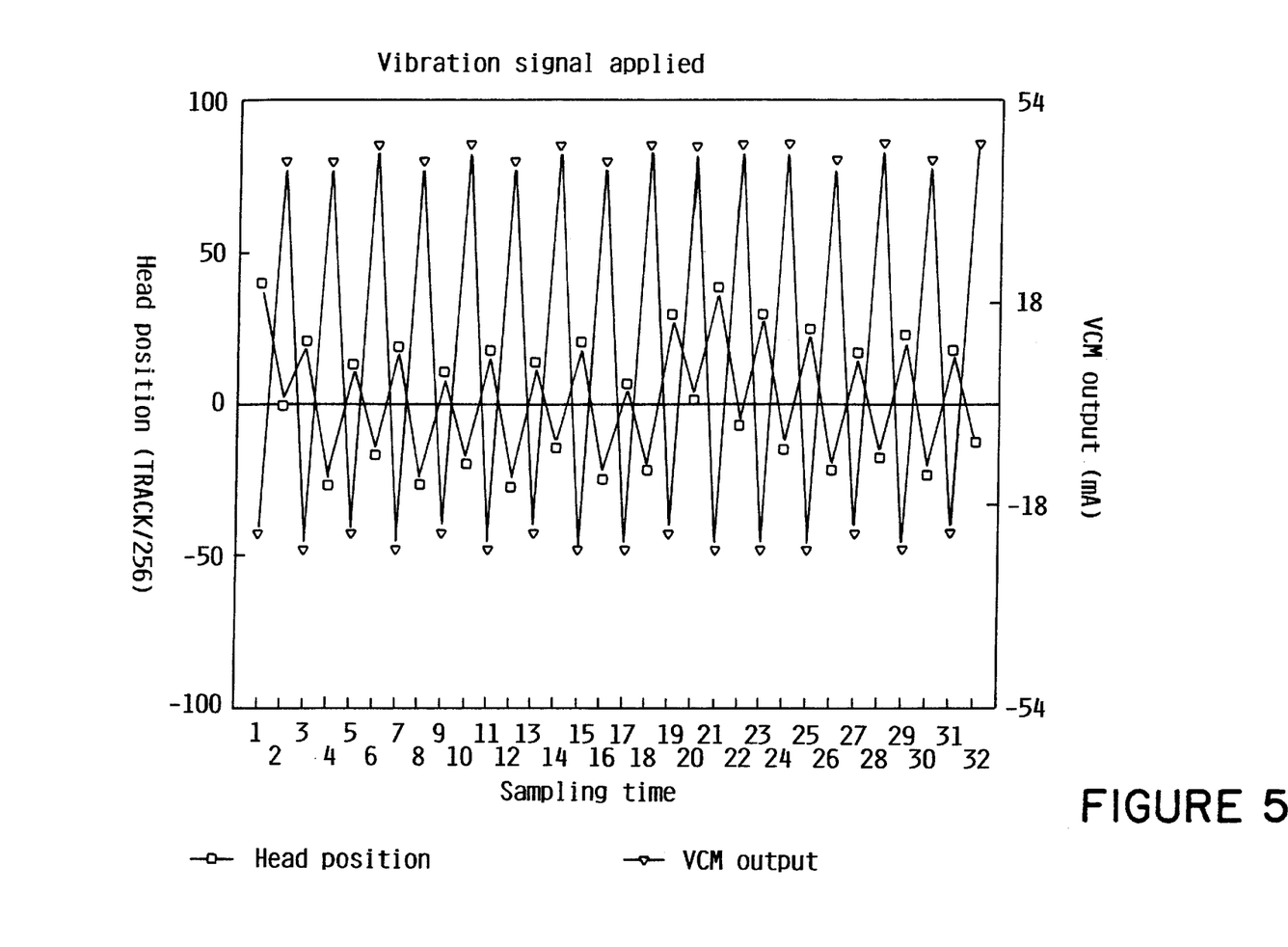
FIG. 5 is a signal waveform diagram obtained by adding a vibration signal to a head driving signal in the disk drive apparatus of the present invention.

FIG. 5 shows an input signal waveform and movement of a head when the signal from the vibration signal generating means 52 is superimposed on the signal from the controller 43 and input to the VCM driving means 45. In FIG. 5, the X axis shows the sampling time and the left Y axis shows the head position on a target track in accordance with a servo signal read by a head. On this Y axis, value 0 indicates that a head is positioned on a desired portion of a target track and the value 256 indicates that a head is shifted from the desired portion by one track width. The right Y axis shows the input to VCM driving means 45. FIG. 5 shows an exemplary case in which a vibration signal with the maximum current of 25 mA and a frequency one-half the sampling frequency is superimposed on the signal from the controller 43, as illustrated in FIG. 3. FIG. 5 illustrates that the head position vibrates at the same frequency of the vibration signal. The amplitude and frequency of the vibration signal can optionally be selected in a range in which a head can read the servo signal of a track.

Because a head can read a servo signal from a disk while it is vibrated, the head can vibrate on desired track portion and one can increase the thermal-asperity hit rate by keeping the head on a desired track position accurately. A higher error recovery rate is expected as the vibration-signal applying time increases and the error recovery rate can optionally be set in accordance with a set error recovery time.

Figure 6A:
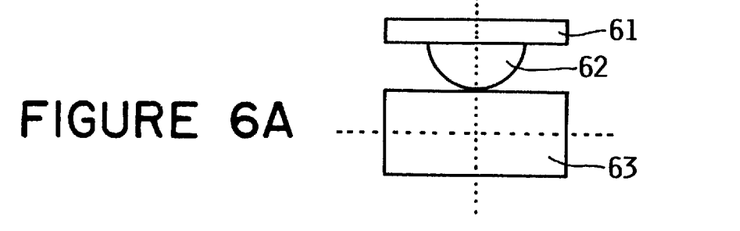
Figure 6B:
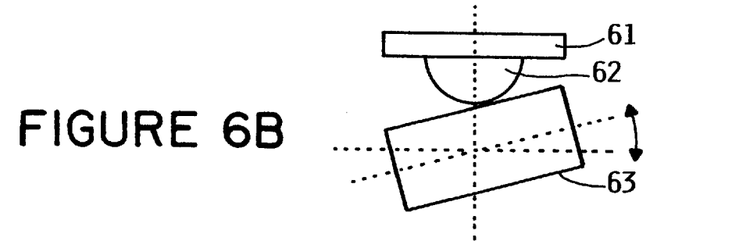
Figure 6C:
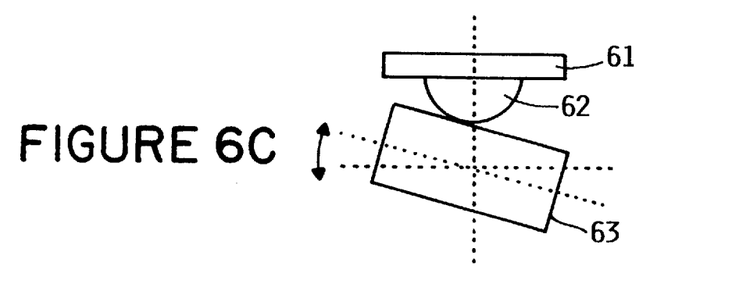

FIGS. 6(a) to 6(c) show the movement of a MR head when a vibration signal is applied. FIGS. 6(a) to 6(c) are front views of a head assembly 63, in which the head assembly 63 is secured to a dimple 62 integrated with a flexure 61. In the normal read operation, the assembly 63 is kept horizontal as shown in FIG. 6(a). By applying a vibration signal to a VCM, the head assembly 63 starts rolling about the joint with the dimple 62 shown in FIGS. 6(b) and (c).

Figure 7:
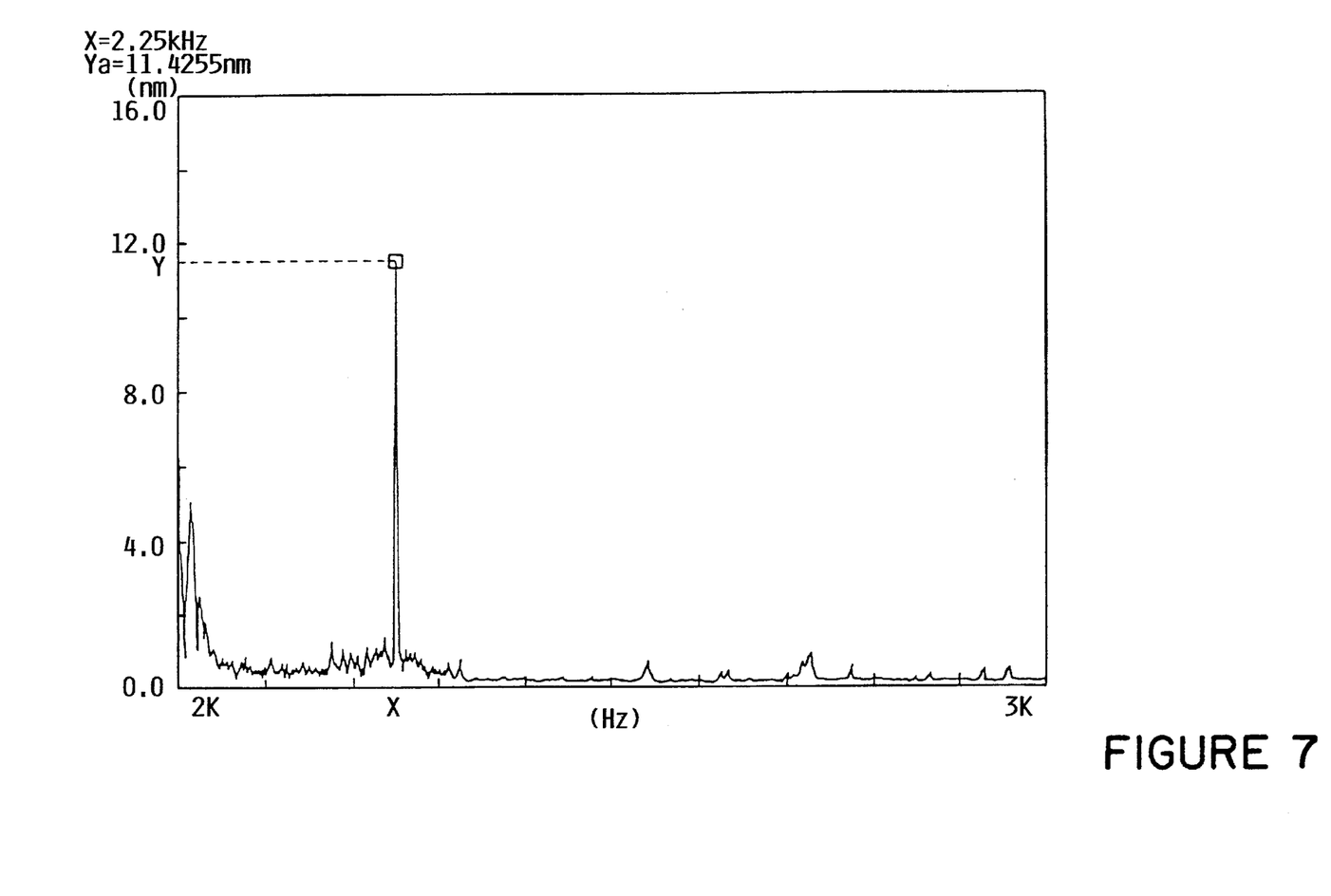
FIG. 7 shows vertical vibration state of a head in accordance with a driving signal added with the vibration signal of the present invention.
Figure 8:
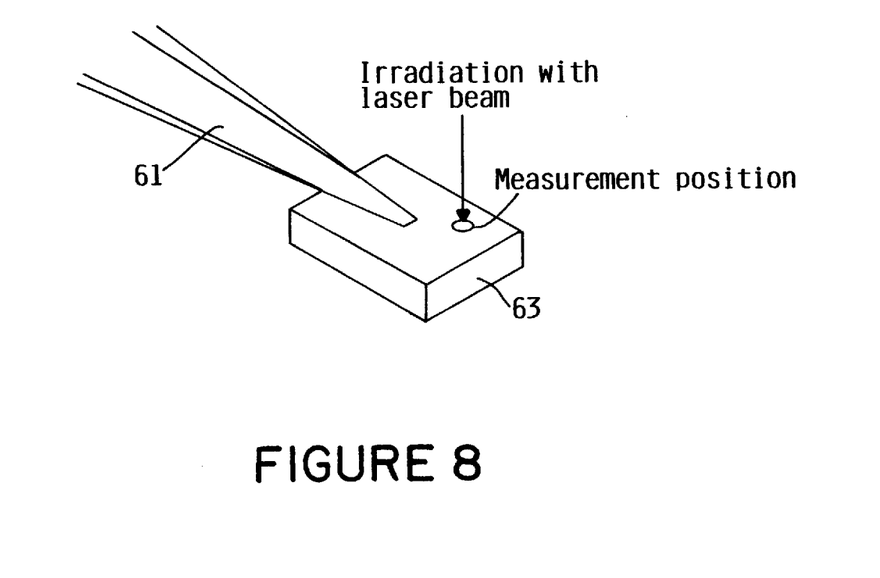
FIG. 8 shows how the vertical vibration state diagram in FIG. 7 was measured.

FIG. 7 shows a vibration frequency spectrum of the head assembly 63 in the direction vertical to the disk surface. The Y axis shows the longitudinal amplitude of the vibration; the X axis shows the vibration frequency. The spectrum is measured by applying a laser beam to a predetermined measurement point of the head assembly 63 as shown in FIG. 8. FIG. 7 shows a measurement result when superimposing a 2.25-kHz signal serving as a vibration signal on a VCM driving signal. From FIG. 7, it is found that the magnitude of vibrations at the point where the peak of vertical-directional vibrations is formed is Ya=11.4255 nm and the frequency is about 2.25 kHz, and the strongest vibration is generated at a point coinciding with an applied frequency. That is, it is explained from FIG. 7 that the head assembly generates vertical vibrations at a frequency equivalent to the applied vibration signal frequency.

Figure 9A:
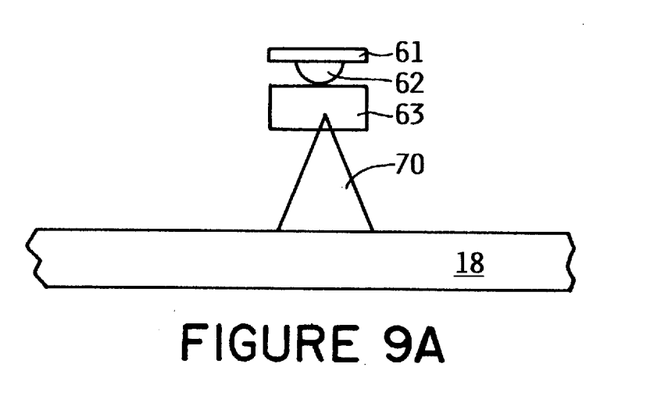
Figure 9B:
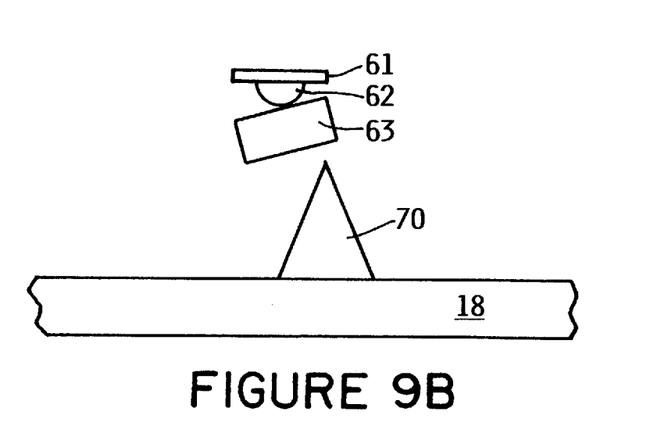
Figure 9C:
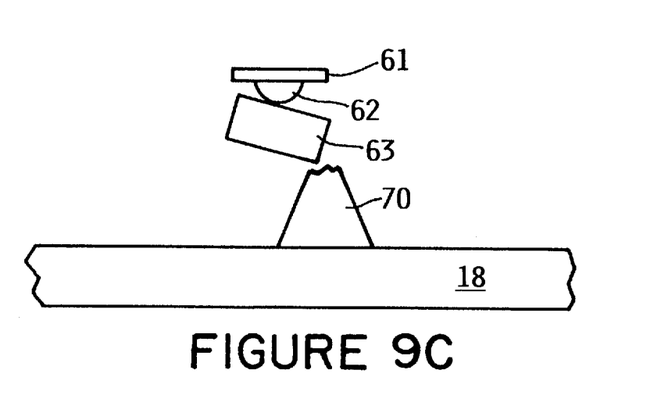

FIGS. 9(a) to 9(c) show the states in which a thermal asperity 70 is removed from a disk when vibrations occur in a head. FIG. 9(a) shows the state in which the head assembly 63 hits the thermal asperity 70. In this case, the signal change shown in FIG. 4(a) occurs in data reading operation. FIGS. 9(b) and 9(c) show the states in which a vibration signal is applied while the head center is shifted from the thermal asperity to cause the head assembly 63 to roll. In FIG. 9(c), an edge of the head assembly 63 hits the thermal asperity 70 to smash it. In FIG. 9, the head assembly 63 is so positioned that the portion of the head most closely approaching the disk surface efficiently hits the thermal asperity. Therefore, rolling motion is generated by shifting the head up to predetermined number of tracks from the track in which the thermal asperity was detected in order to efficiently hit the thermal asperity. In the case of FIGS. 9(b) and 9(c), the edge of the head assembly 63 is adjusted onto the thermal asperity 70.

It is preferable to set a head to a position where it can efficiently hit the thermal asperity on the disk. In the case of the head assembly shown in FIG. 9, an edge of the head assembly is positioned on a thermal asperity. This position of the MR head is shifted fifty tracks from the track causing an error. It is necessary to determine this head position, that is, the number of moving tracks, in accordance with the shape of the MR head and the track density. That is, it is necessary to select a point for most efficiently hit a protrusion on a disk when vibrations are generated.

It is possible to generate a vibration signal having a predetermined frequency by hardware and superimpose it on a VCM driving signal. It is also possible to generate the vibration signal with microcodes for VCM servo control. By programming the microcodes it is possible to add and subtract a predetermined signal value to and from a servo control signal at an interval of one-half the servo signal sampling cycle. That is, it is possible to generate a signal to be output to a VCM as shown in FIG. 5. When a head follows a track, assuming that the average amplitude of a VCM driving signal is V, the sampling cycle is T, and the amplitude of a vibration signal is N, V+N and V−N signal are alternately supplied with a cycle twice (2T) the VCM driving signal.

Figure 10:
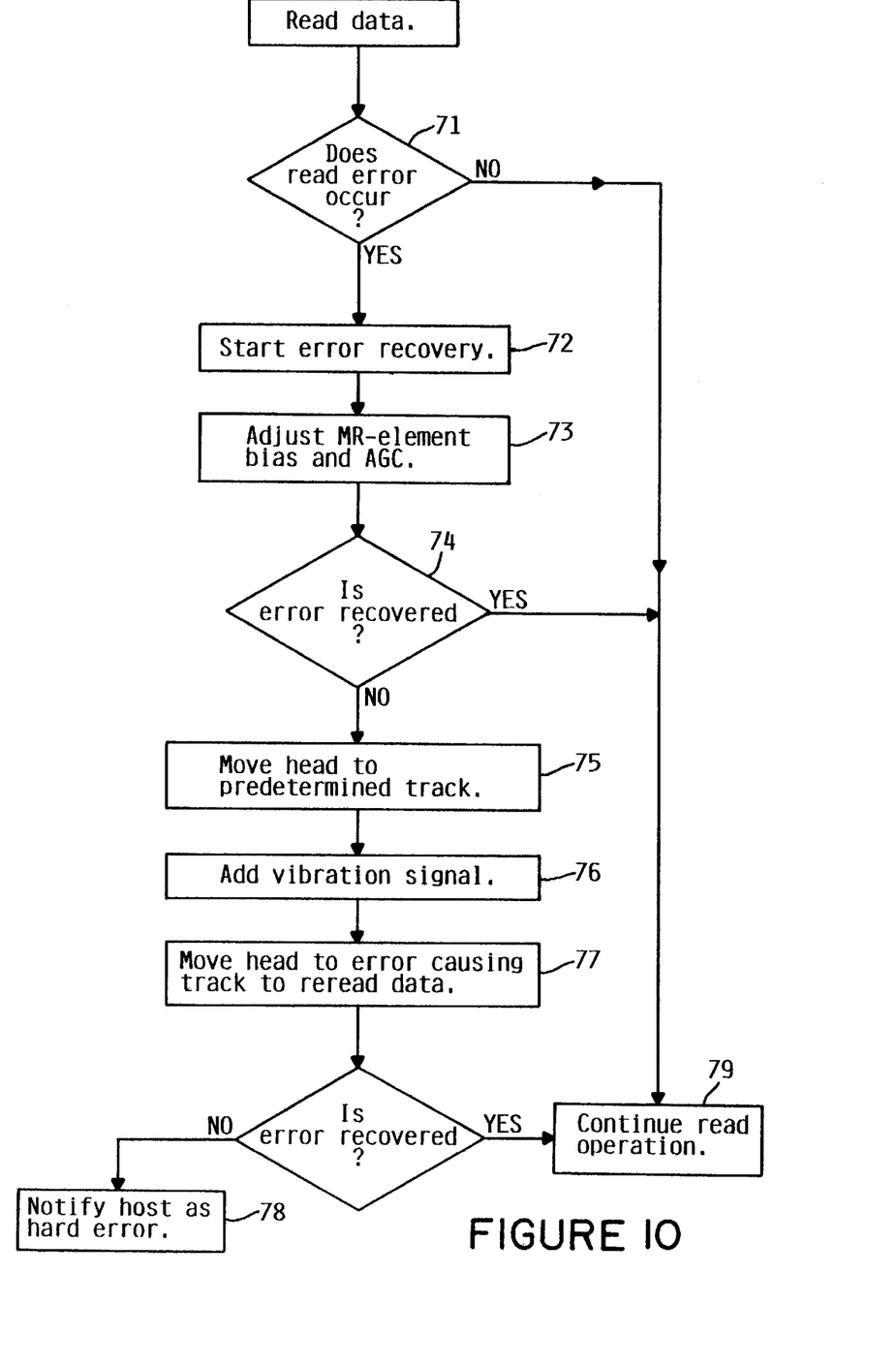
FIG. 10 is an error recovery flow of the present invention.

Then, the data recovery operation of the present invention for executing the removal of a thermal asperity is described in accordance with the flow chart of FIG. 10. FIG. 10 shows the process of error recovery executed when an error occurs. A series of these steps are executed by the HDC 30. After occurrence of a read error is detected in step 71, error recovery starts in step 72. In step 73, conventional error recovery such as change of bias current of an MR element or adjustment of gain of automatic gain control is executed. After some types of error recovery steps are executed, read operation is executed again. When read operation is completed successfully, the program goes out of an error recovery routine (step 74) and returns to the normal data read operation (step 79).

In addition to these conventional error recovery steps, the error recovery step of the present invention is executed. When an error does not recover in step 74, a head is moved from an error causing track to a predetermined track in step 75. This operation is performed to position the most approaching point of a head to a disk when the head rolls on a thermal asperity. Thereafter, a vibration signal is added in step 76 to vibrate the head. Then, the head is moved to the error causing track to execute read operation again in step 77 and verify error recovery. When the error is recovered, a read operation is continued (step 79). When the error is not recovered, the host is notified that the error is an unrecoverable hard error (step 78). It is also possible to execute error recovery step to generate a vibration signal before other error recovery steps.

The invention, thus having been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. A disk drive apparatus, comprising:
    (a) a disk;
    (b) a magnetoresistive head attached to a dimple integrated with a flexure, said magnetoresistive head for reading and writing data to said disk;
    (C) a head driving assembly for driving said head in a radial direction of said disk in response to a driving signal;
    (d) a vibration signal generator for generating a vibration signal having a frequency one-half the frequency of said driving signal;
    (e) a means for superimposing said vibration signal onto said driving signal, said vibration signal and said driving signal supplied to said head driving apparatus; and
    (f) positioning means to position said head in the vicinity of said track having said read or write error
    wherein when a read or write error is detected, said magnetoresistive head is positioned in the vicinity of said track having said error and vibrations having horizontal and vertical components are induced in said head of sufficient amplitude so that as said magnetoresistive head vibrates it rolls about said dimple and an edge of said magnetoresistive head hits said protrusion or foreign matter on said disk thereby removing said protrusion or foreign matter and recovering said error.

2. An error recovery method for recovering an error occurring in a disk drive apparatus, the method comprising the steps of:

(a) positioning a magnetoresistive head based on a size and geometry of the head and upon a track density of the disk in the vicinity of a track having a thermal asperity;

(b) generating a vibration signal having a frequency one-half the frequency of a head driving signal;

(c) superimposing said vibration signal onto a head driving signal to form a combined signal supplied to a head driving means;

(d) vibrating said head in at least a vertical direction in accordance with said combined signal;

(e) hitting and removing a protrusion or foreign matter on said disk by an edge of an air bearing surface of said head.

* * * * *